(12) United States Patent
Li et al.

(10) Patent No.: US 8,314,991 B2
(45) Date of Patent: Nov. 20, 2012

(54) VARIABLE TRANSMISSION COMPOSITE INTERFERENCE FILTER

(75) Inventors: Jaime Antonio Li, Martinsville, VA (US); Coby Lee Hubbard, Bassett, VA (US)

(73) Assignee: CPFilms Inc., Fieldale, VA (US)

( * ) Notice: Subject to any disclaimer, the term of this patent is extended or adjusted under 35 U.S.C. 154(b) by 894 days.

(21) Appl. No.: 12/263,441

(22) Filed: Oct. 31, 2008

(65) Prior Publication Data

US 2010/0110550 A1 May 6, 2010

(51) Int. Cl.
*G02B 1/10* (2006.01)
(52) U.S. Cl. ...................................... 359/588
(58) Field of Classification Search .................. 359/580, 359/584–586, 588, 589
See application file for complete search history.

(56) References Cited

U.S. PATENT DOCUMENTS

| | | | |
|---|---|---|---|
| 4,625,108 A | 11/1986 | Nestel | |
| 5,159,199 A | 10/1992 | LaBaw | |
| 5,502,595 A | 3/1996 | Kuo et al. | |
| 5,696,859 A | 12/1997 | Onaka | |
| 6,031,653 A * | 2/2000 | Wang | 359/247 |
| 6,112,005 A * | 8/2000 | Liu et al. | 385/130 |
| 6,316,110 B1 * | 11/2001 | Anzaki et al. | 428/432 |
| 6,717,965 B2 | 4/2004 | Hopkins, II | |
| 7,002,696 B1 | 2/2006 | Miron | |
| 7,317,576 B2 * | 1/2008 | Van Nutt et al. | 359/588 |
| 2003/0012230 A1 | 1/2003 | Hopkins | |
| 2003/0048985 A1 | 3/2003 | Hulse | |
| 2004/0080834 A1 | 4/2004 | Thompson | |
| 2005/0018301 A1 | 1/2005 | Uehara | |
| 2005/0152699 A1 | 7/2005 | Hulse | |
| 2006/0007547 A1 * | 1/2006 | Kamikawa | 359/589 |
| 2006/0197943 A1 | 9/2006 | Kewitsch | |
| 2006/0228553 A1 * | 10/2006 | Argoitia et al. | 428/403 |
| 2006/0256428 A1 | 11/2006 | Kochergin | |
| 2007/0166045 A1 | 7/2007 | Wang | |

OTHER PUBLICATIONS

Notification of Transmittal of The International Search Report and The Written Opinion of the International Searching Authority for International Application No. PCT/US2009/061840, 15 pp., mailed Dec. 16, 2009.

* cited by examiner

*Primary Examiner* — Alessandro Amari
*Assistant Examiner* — Kimberly N Kakalec
(74) *Attorney, Agent, or Firm* — Lewis, Rice & Fingersh, LC.

(57) ABSTRACT

Now, according to the present invention, interference filters are provided that incorporate two band pass interference filters into a single composite interference filter. The two filters each have at least one band pass curve that is centered at the same wavelength for light that is incident at a given angle to the filter surface. The band pass curve shifts of the filter components, however, are dissimilar, which results in a decrease of transmitted light as the angle of incidence diverges from the given angle.

16 Claims, 4 Drawing Sheets

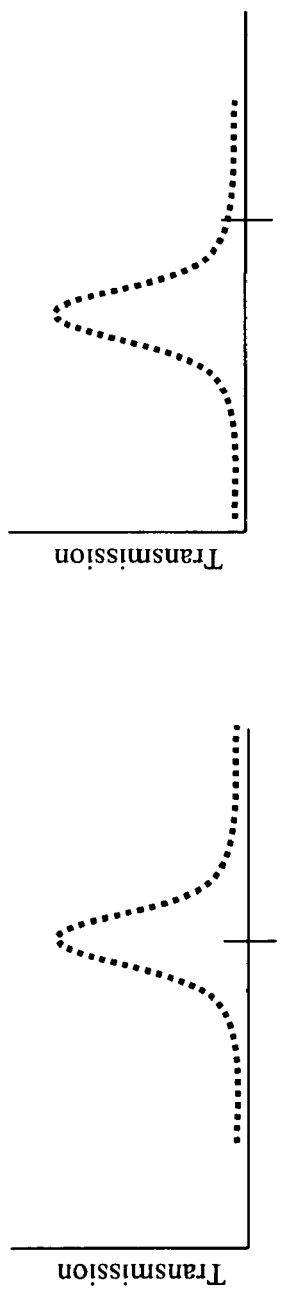
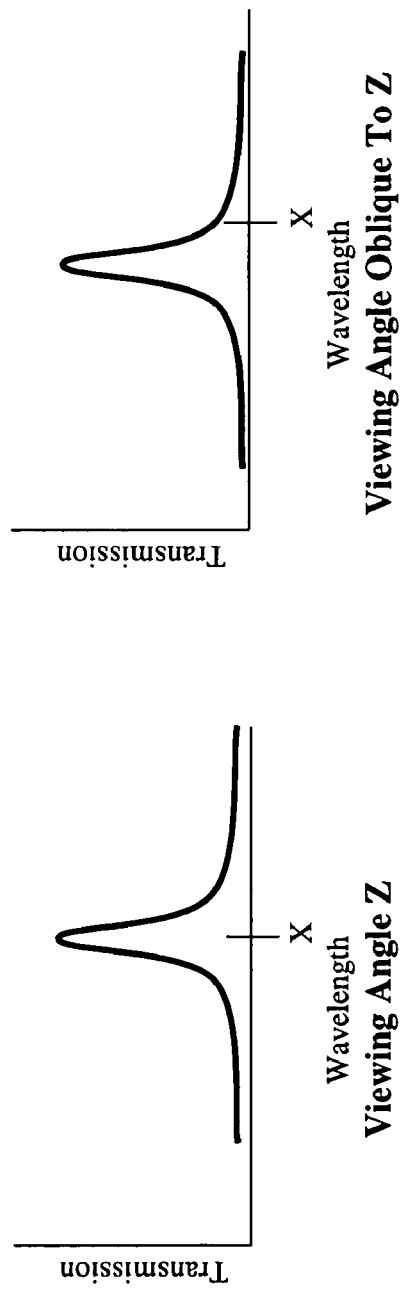

VARIABLE TRANSMISSION COMPOSITE INTERFERENCE FILTER

FIELD OF THE INVENTION

The present invention is in the field of light filters in general, and, in particular, the present invention is in the field of band pass interference filters used to selectively transmit desired wavelengths of visible light.

BACKGROUND

Devices that filter selected wavelengths of light are well known and have been in use for many years. Typically, a source of white light or light comprising components from wavelengths throughout the visible spectrum is filtered so as to transmit only the desired wavelengths. Among the various filters that are conventionally available for use as a light filter, absorption filters and interference filters are in common use.

One type of interference filter utilizes a dielectric layer disposed between two very thin layers of a reflective material. The resulting filter transmits light within a band of the visible spectrum. The wavelength band of the transmitted light is not constant at all angles of incidence, however. Typically the transmitted band will shift as the angle is changed. The apparent color of transmitted light will therefore change as the viewing angle of an observer is changed. The wavelength of light that is transmitted and the magnitude of the band shift are directly related to the thickness of the dielectric layer and the index of refraction of the dielectric material.

Because there are many dielectric compounds from which to choose, and because the dimensions of the various components can be finely controlled, band pass interference filters can be manufactured to transmit light in a wide variety of bands along the visible light spectrum.

What are needed in the art are novel filters that advantageously use the optical properties of conventional interference filters to produce useful filtering effects.

SUMMARY OF THE INVENTION

Now, according to the present invention, interference filters are provided that incorporate two band pass interference filters into a single composite interference filter. The two filters each have at least one band pass curve that is centered at the same wavelength for light that is incident at a given angle to the filter surface. The band pass curve shifts of the filter components, however, are dissimilar, which results in a decrease of transmitted light as the angle of incidence diverges from the given angle.

BRIEF DESCRIPTION OF THE FIGURES

FIG. 1a is a graph showing the light transmission of a first interference filter at a given angle of incidence.

FIG. 1b is a graph showing the light transmission of a first interference filter at an oblique angle of incidence.

FIG. 2a is a graph showing the light transmission of a second interference filter at a given angle of incidence.

FIG. 2b is a graph showing the light transmission of a second interference filter at an oblique angle of incidence.

DETAILED DESCRIPTION

The present invention provides interference filters that can be used in a wide variety of applications, including, for example, as a privacy barrier that restricts complete viewing of an area through a window onto which a filter has been affixed.

Interference filters of the present invention are composite filters that comprise at least two band pass interference filters that have been combined into a single composite filter. The two band pass filters have light transmission bands that are centered on the same wavelength for light that is incident on the filter at a given angle.

FIG. 1a shows a first filter that has a band pass centered at wavelength X for light that is incident at a given angle Z. FIG. 2a shows a second filter that has a band pass centered at wavelength X for light that is incident at the same given angle. FIG. 1b shows a transmission band for the filter shown in FIG. 1a at an angle that is oblique to angle Z. The transmission band shown in FIG. 1b has "shifted" relative to the transmission band shown in FIG. 1a, and is now centered at a wavelength that is shorter than wavelength X. A transmission band shift of a different magnitude is shown in FIG. 2b, which shows the transmission band for the filter of FIG. 2a for light incident at an angle that is oblique to angle Z.

Either of the filters shown in FIG. 1a or 1b, as used conventionally, will result in a filter that will pass an approximately equivalent amount of light within a shifting band along the visible spectrum as the viewing angle of incident light is changed. This effect might be seen, for example, as a shift in color from a yellow light to a green light as the angle of a viewer is moved from a normal viewing angle to an oblique viewing angle.

The present invention combines at least two interference filters, such as those shown in FIGS. 1a and 2a, to produce a composite filter that undergoes a reduction in total light transmitted as the incident light angle diverges from the given angle. FIG. 3a shows a light transmission curve for one example of a composite filter of the present invention for light incident at a given angle Z. As can be seen in the Figure, the combination of the two filters results in a filter that transmits light at the given incidence angle in a band that is the union (overlap) of the two transmission bands.

Figure 3B:
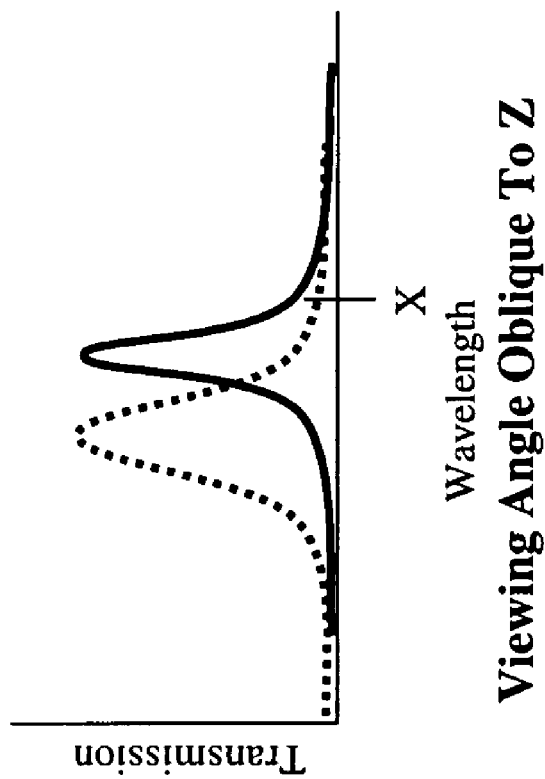
FIG. 3b is a graph showing the light transmission of a composite interference filter of the present invention at an oblique angle of incidence.
Figure 3A:
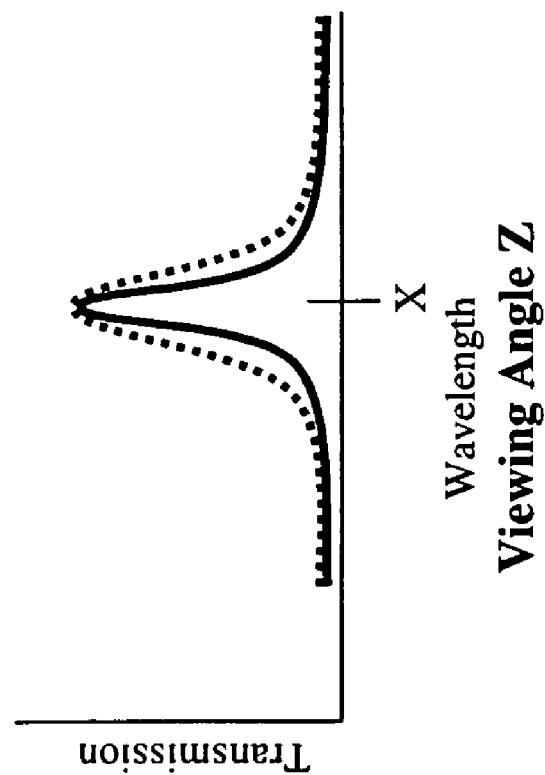
FIG. 3a is a graph showing the light transmission of a composite interference filter of the present invention at a given angle of incidence.

FIG. 3b shows the effect that is achieved for a composite filter of the present invention when light is incident at an angle oblique to Z. As shown in the Figure, the different band shift magnitudes of the two individual filters results in an almost complete transmission blockage over the applicable wavelength range.

Embodiments of the present invention that use two filters, as just described, can be used to effectively allow viewing at a normal angle through the composite filter while restricting viewing through the filter at oblique angles. For these embodiments, the "given" angle is the angle that is normal to the surface of the filter, and light transmission will generally decrease as the viewing angle off of the normal viewing angle increases.

In other embodiments, the given angle can be up to 70° off of the normal, which, in various embodiments, results in a filter that allows very little light to pass through at close to the normal angle, but that allows a significant amount of light to pass at angles far off the normal. In further embodiments, the given angle can be any angle between the normal angle and 60°, 50°, 40°, 30°, or 20° off of the normal.

In yet further embodiments, filters having multiple peaks in their transmission spectrum can be used as long as at least one peak from each of the two filters exhibit the properties described above and shown in the figures.

Figure 4:
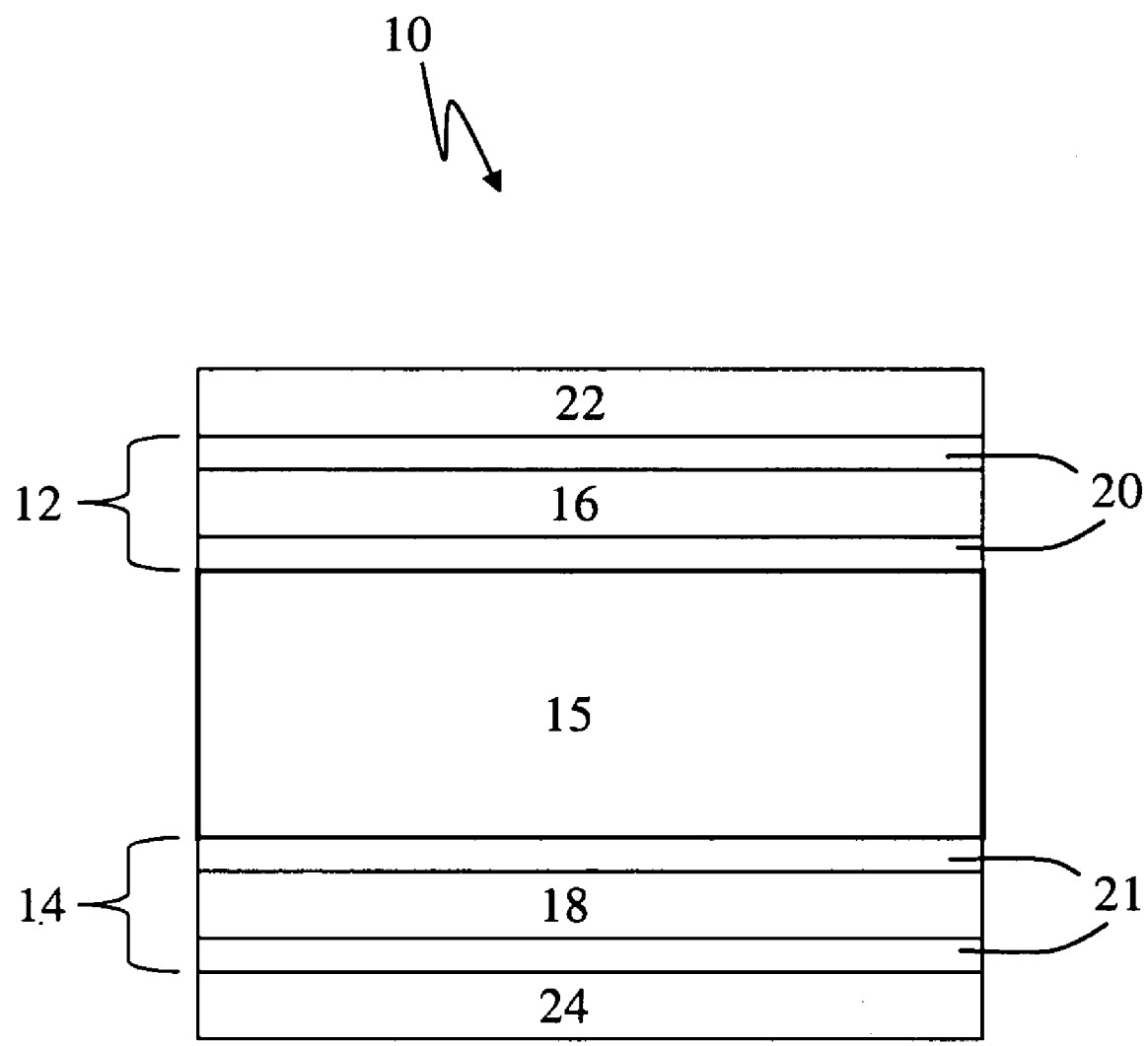
FIG. 4 is a schematic representation of a cross-section of one embodiment of a composite interference filter of the present invention.

To achieve the desired optical effect, at least two interference filters are combined to form a composite filter of the present invention, as shown generally at 10 in FIG. 4.

As shown in FIG. 4, a first band pass interference filter 12 comprises a first dielectric layer 16 disposed between two reflective layers 20. A polymer film 22 is disposed adjacent the first band pass interference filter 12. A second band pass interference filter 14 comprises a second dielectric layer 18 disposed between two reflective layers 21. A polymer film 24 is disposed adjacent the second band pass filter 14. The two polymer films 22, 24 are optional components in these embodiments, and can be added as a substrate onto which the interference filters are formed, or, for example, as an added protective layer. The polymer films 22, 24 can include a primer layer to facilitate formation of the interference filter reflective layer component in embodiments in which the polymer films are used as substrates. Alternatively, in various embodiments, hardcoat layers can be substituted for the polymer films 22, 24, and, in yet further embodiments, rigid substrates such as glass or rigid plastic can be used in place of the polymer films 22, 24. Hardcoat layers can also be used as primer layers or smoothing layers between a band pass interference filter and the substrate on which it is formed.

A massive spacer 15, which can comprise any suitable material and which will be described in detail below, is disposed between the two interference filters.

The resulting composite filter 10 will exhibit the combined filtering effect of both of the band pass interference filters as transmitted light is observed across the full range of viewing angles, as described above.

Figure 5:
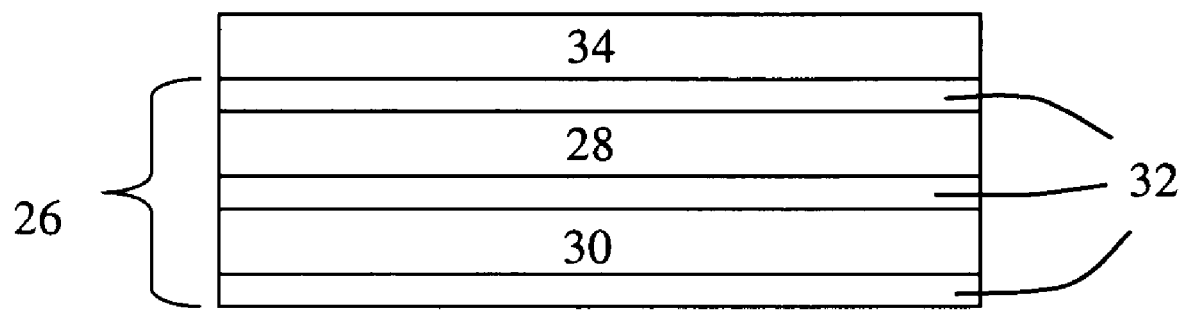
FIG. 5 is a schematic representation of a cross-section of one embodiment of a double cavity interference filter of the present invention.

The embodiment shown in FIG. 4 can be modified to form further embodiments by adding layers to the first band pass interference filter 12, the second band pass interference filter 14, or both. In various embodiments, one or both of the filters are modified to add one or more further layers of dielectric and reflective layers. FIG. 5 shows one such embodiment. As shown in FIG. 5, a dual cavity band pass interference filter 26 comprises a first dielectric layer 28, a second dielectric layer 30, and three reflective layers 32. As with the embodiments described above, an optional polymer film layer 34 can be included as a substrate upon which to form the filter or as a protective layer.

Dual cavity filters such as those described above can be used in place of one or both of the single cavity filters shown in FIG. 4 in composite filters of the present invention.

In addition to dual cavity filters, band pass interference filters having three or more dielectric layers and associated reflective layers can also be employed, where appropriate, in place of one or both of the interference filters in a composite filter of the present invention.

As used herein, two band pass interference filters can be combined with a spacer, or in some embodiments, no spacer, to form a composite filter of the present invention if the total amount of transmitted visible light at an angle of 45 degrees to the given angle (where the two curve centers are aligned) is less than 80% of the transmitted visible light at the given angle. In some embodiments, the total amount of transmitted visible light at an angle of 45 degrees to the given angle (where the two curve centers are aligned) is less than 60%, 40%, or 20% of the transmitted visible light at the given angle.

In other embodiments, the figures given immediately above apply to the infrared region of the electromagnetic spectrum, the ultraviolet region, or to other regions, and filters of the present invention can be used in conjunction with infrared remote devices, communication devices, or with any device using any part of the electromagnetic spectrum for which the variable transmission of the present invention would be useful.

Interference filters of the present invention are useful in a wide variety of light filtering applications, for example, for light collimation, light elimination, or for anti-counterfeiting measures.

Polymer Film

The polymer film shown in FIG. 4 as elements 22 and 24 and described herein can be any suitable thermoplastic film that is used in performance film applications. In various embodiments, the polymer film can comprise polycarbonates, acrylics, nylons, polyesters, polyurethanes, polyolefins such as polypropylene, cellulose acetates and triacetates, vinyl acetals, such as poly(vinyl butyral), vinyl chloride polymers and copolymers and the like, or another plastic suitable for use in a performance film.

In various embodiments, the polymer film is a polyester film, for example poly(ethylene terephthalate). In various embodiments the polymer film can have a thickness of 0.012 mm to 0.40 mm, preferably 0.025 mm to 0.1 mm, or 0.04 to 0.06 mm. The polymer film can include, where appropriate, a primer layer to facilitate bonding of metallized layers to the polymeric substrate, to provide strength to the substrate, and/or to improve the planarity.

The polymer films are typically optically transparent (i.e. objects adjacent one side of the layer can be comfortably seen by the eye of a particular observer looking through the layer from the other side). In various embodiments, the polymer film comprises materials such as re-stretched thermoplastic films having the noted properties, which include polyesters. In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

A preferred polymer film is poly(ethylene terephthalate).

As used herein and as shown in the figures, a "polymer film" includes multiple layer constructs as well as single layer and coextruded films. For example, two or more separate polymeric layers that are laminated, pressed, or otherwise bound together to form a single film can be used as polymer films of the present invention.

Useful example of polymer films that can be used with the present invention include those described in U.S. Pat. Nos. 6,049,419 and 6,451,414, and U.S. Pat. Nos. 6,830,713, 6,827,886, 6,808,658, 6,783,349, and 6,569,515.

For embodiments in which a polymer film is employed as a massive spacer, the thickness of the polymer film can be those given for massive spacers elsewhere herein.

Dielectric Layers

The dielectric layers of the present invention can comprise any suitable materials, as are known in the art. Useful dielectrics include silicon dioxide, titanium dioxide, magnesium fluoride, and zinc sulfide. In preferred embodiments, the following dielectric pairs are used in two single cavity interference filters in a composite filter of the present invention: $TiO_2$ or $Nb_2O_5$ for the first filter, and $SiO_2$, $MgF_2$, $YF_2$ for the other filter. Generally, dielectric pairs having a large difference in index of refraction are preferred. In various embodiments, that difference is one unit or greater.

The dielectric layers of the present invention can be formed at the appropriate thicknesses so as to provide the desired filtration effect. In various embodiments, the dielectric layers have a thickness of two or more quarter waves. In various embodiments, the two layer pair would have a thickness of 340 to 420 nanometers, for example for a $MgF_2$ layer, and 160 to 240 nanometers, for example for a $TiO_2$ layer.

The dielectric layers of the present invention can have any suitable high/low combination of refractive indices, for example, greater than 2 and less than 1.8, and greater than 2.2 and less than 1.5.

Dielectric layers of the present invention can be formed using any suitable method, as are known in the art, for example, with chemical or physical vapor deposition methods such as evaporation or sputtering. Various layer formation techniques are described in Handbook of Thin-Film Deposition Processes and Techniques, edited by Klaus K. Schuegraf, Noyes Publications.

Reflective Layers

Reflective layers of the present invention are well known in the art and include any suitable metal composition. In various embodiments reflective layers of the present invention comprise a material that is highly reflective to infrared radiation. Examples include silver, gold, aluminum, and copper and their alloys. High infrared radiation reflection is desirable for many applications to prevent the transmission of heat through the filter, such as for embodiments in which incandescent light is filtered. Infrared reflection is also a desirable characteristic for heat sensitive substrates, such as poly(ethylene terephthalate).

Reflective layers of the present invention can be formed using any suitable method, for example sputtering, and can have any suitable thickness.

The several reflective layers of the present invention can comprise the same material or different material and can have the same thickness or different thickness, as is desired for a particular embodiment.

In preferred embodiments, metallic reflective layers comprise silver or silver alloys.

Massive Spacer

Massive spacers of the present invention include any suitable laminating adhesives or polymer film layers or combinations of the two. Further, massive spacers can include glass and rigid plastic layers, for example polycarbonate layers, and other suitable rigid substrates.

Laminating adhesives include those that are conventionally used in the art to bond films together, for example and without limitation, poly(vinyl butyral), polyurethane, silicone, and the like.

Massive spacers of the present invention include combinations of polymer films and laminating adhesives. In some embodiments, for example, the two interference filters can be formed on two separate polymer film substrates (elements 22 and 24 in FIG. 4) and then laminated to a polymer film spacer with an adhesive, in which case the polymer film spacer and the adhesive form the massive spacer. Polymer film layers include those disclosed elsewhere herein.

In yet further embodiments, a massive spacer can be formed using only a polymer film of the desired massive spacer thickness by forming the band pass interference filters directly on a single polymer film. In these embodiments, a first band pass interference filter is formed on one surface and a second band pass interference filter is formed on the opposite surface of the polymer film. The exposed filter surfaces can then be protected with a polymer film layer or a hardcoat, as is known in the art. The massive spacer polymer film can include primer layers, as appropriate.

Massive spacers of the present invention can have any suitable thickness, and in various embodiments the massive spacer has a thickness of at least seven quarter waves optical thickness. In various embodiments, a massive spacer has a thickness of 0.8 to 1.2 microns.

Massive spacers of the present invention can also be combinations of the above-described materials. For example, a massive spacer can be a combination of glass and polymer films, wherein one or more polymer films are bonded to the glass. Glass and rigid plastic massive spacers of the present invention can have any suitable thickness, and, in various embodiments, such massive spacers can have thicknesses up to 1 millimeter, and, in other embodiments, thicknesses can be greater than 1 millimeter.

Composite filters of the present invention can effectively be used in many applications, for example and without limitation, as an applied filter on windows and glass applications, as a color filter for various lighting applications, anti-counterfeiting applications, directional light filters, and the like.

By virtue of the present invention, composite interference filters are provided that allow for the variable filtration of light through a range of viewing angles. Among the many benefits of the composite filters is the ability to afford visual privacy through an opening while also allowing the transmission of some of the incident light at acceptable angles.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

Any figure reference numbers given within the abstract or any claims are for illustrative purposes only and should not be construed to limit the claimed invention to any one particular embodiment shown in any figure.

Unless otherwise noted, drawings are not drawn to scale.

Each reference, including journal articles, patents, applications, and books, referred to herein is hereby incorporated by reference in its entirety.

We claim:

1. A composite interference filter comprising:
    a first band pass interference filter comprising a first dielectric layer disposed between two reflective layers, said first band pass interference filter having a transmission band centered at a given wavelength at a given angle and having a first band shift;
    a second band pass interference filter comprising a second dielectric layer disposed between two reflective layers, said second band pass interference filter having a transmission band centered at said given wavelength and at said given angle and having a second band shift different from said first band shift; and a massive spacer disposed between said first band pass interference filter and said second band pass interference filter;

wherein said difference between said first band shift and said second band shift causes a reduction in transmitted visible light through said composite interference filter at an angle forty-five degrees from said given angle, compared to transmitted visible light through said composite interference filter at said given angle.

2. The composite interference filter of claim 1, wherein said first dielectric layer comprises a dielectric selected from the group consisting of $TiO_2$ and $Nb_2O_5$.

3. The composite interference filter of claim 2, wherein said second dielectric layer comprises a dielectric selected from the group consisting of $SiO_2$, $MgF_2$, and $YF_2$.

4. The composite interference filter of claim 1, wherein said massive spacer comprises a member selected from the group consisting of adhesive, poly(ethylene terephthalate), and air.

5. The composite interference filter of claim 1, wherein said reflective layers comprises a member selected from the group consisting of silver, gold, aluminum, and copper.

6. The composite interference filter of claim 1, wherein said first dielectric layer comprises a material having an index of refraction of greater than 2 and said second dielectric layer comprises a material having an index of refraction of less than 1.8.

7. The composite interference filter of claim 1, wherein said first dielectric layer comprises a material having an index of refraction of greater than 2.2 and said second dielectric layer comprises a material having an index of refraction of less than 1.6.

8. The composite interference filter of claim 1, wherein said difference between said first band shift and said second band shift causes at least a 65% reduction in transmitted visible light through said composite interference filter at an angle forty-five degrees from said given angle, compared to transmitted visible light through said composite interference filter at said given angle.

9. The composite interference filter of claim 8, wherein said difference between said first band shift and said second band shift causes at least a 80% reduction in transmitted visible light through said composite interference filter at an angle forty-five degrees from said given angle, compared to transmitted visible light through said composite interference filter at said given angle.

10. The composite interference filter of claim 1, wherein said massive spacer comprises a laminating adhesive.

11. The composite interference filter of claim 1, wherein said massive spacer comprises a polymer film.

12. The composite interference filter of claim 1, wherein one of said first band pass interference filter and said second band pass interference filter comprises a double cavity filter.

13. The composite interference filter of claim 1, wherein both of said first band pass interference filter and said second band pass interference filter comprise double cavity filters.

14. The composite interference filter of claim 1, wherein said first band pass interference filter has more than one transmission peak.

15. The composite interference filter of claim 14, wherein each of said first band pass interference filter and said second band pass interference filter has more than one transmission peak.

16. A method of altering the transmission spectrum of electromagnetic radiation through an opening, comprising the steps of:

providing a composite interference filter comprising,
a first band pass interference filter comprising a first dielectric layer disposed between two reflective layers, said first band pass interference filter having a transmission band centered at a given wavelength at a given angle and having a first band shift;
a second band pass interference filter comprising a second dielectric layer disposed between two reflective layers, said second band pass interference filter having a transmission band centered at said given wavelength and at said given angle and having a second band shift different from said first band shift; and,
a massive spacer disposed between said first band pass interference filter and said second band pass interference filter;
wherein said difference between said first band shift and said second band shift causes a reduction in transmitted visible light through said composite interference filter at an angle forty-five degrees from said given angle, compared to transmitted visible light through said composite interference filter at said given angle;

passing said electromagnetic radiation through said composite interference filter at said given angle; and passing said electromagnetic radiation through said composite interference filter at an angle forty-five degrees from said given angle.

* * * * *